(12) United States Patent
Sahin et al.

(10) Patent No.: US 11,360,892 B2
(45) Date of Patent: Jun. 14, 2022

(54) CACHE HIT RATIO SIMULATION USING A PARTIAL DATA SET

(71) Applicant: EMC IP Holding Company LLC, Hopkinton, MA (US)

(72) Inventors: Adnan Sahin, Needham, MA (US); Amnon Naamad, Brookline, MA (US)

(73) Assignee: Dell Products, L.P., Hopkinton, MA (US)

( * ) Notice: Subject to any disclaimer, the term of this patent is extended or adjusted under 35 U.S.C. 154(b) by 107 days.

(21) Appl. No.: 16/816,540

(22) Filed: Mar. 12, 2020

(65) Prior Publication Data

US 2020/0210334 A1    Jul. 2, 2020

Related U.S. Application Data

(62) Division of application No. 15/649,925, filed on Jul. 14, 2017, now Pat. No. 10,713,164.

(51) Int. Cl.
*G06F 12/0802* (2016.01)
*G06F 12/0862* (2016.01)
*G06F 17/18* (2006.01)
*G06F 17/11* (2006.01)

(52) U.S. Cl.
CPC ...... *G06F 12/0802* (2013.01); *G06F 12/0862* (2013.01); *G06F 17/11* (2013.01); *G06F 17/18* (2013.01); *G06F 2212/6026* (2013.01)

(58) Field of Classification Search
CPC .. G06F 12/0802; G06F 12/0862; G06F 17/18; G06F 2212/6026; G06F 17/11; G06F 12/0864

USPC ......................................................... 703/2, 13
See application file for complete search history.

(56) References Cited

U.S. PATENT DOCUMENTS

| | | | | |
|---|---|---|---|---|
| 8,935,493 | B1 * | 1/2015 | Dolan | G06F 3/0649 |
| | | | | 711/161 |
| 9,785,353 | B1 * | 10/2017 | Marshak | G06F 3/061 |
| 9,983,795 | B1 * | 5/2018 | Naamad | G06F 3/0629 |
| 10,101,917 | B1 * | 10/2018 | Agans | G06F 12/127 |
| 2011/0288847 | A1 * | 11/2011 | Narayanan | G06F 11/3476 |
| | | | | 703/19 |

* cited by examiner

*Primary Examiner* — Juan C Ochoa
(74) *Attorney, Agent, or Firm* — Anderson Gorecki LLP

(57) ABSTRACT

A method of cache hit ratio simulation using a partial data set includes determining a set of sampled addresses, the set of sampled addresses being a subset of all addresses of a storage system of a storage environment. The method further includes using, by a simulation engine, a cache management algorithm to determine a cache hit ratio of the sampled addresses, the cache management algorithm being also used by a cache manager to place a portion of the addresses of the storage system into cache during a runtime operation. The method further includes determining a quantity of memory access operations to frequently accessed addresses in the set of sampled addresses, and correcting, by the simulation engine, the cache hit ratio of the sampled addresses based on the quantity of memory access operations to the frequently accessed addresses in the set of sampled addresses. The simulation also handles sequential operations accurately.

16 Claims, 4 Drawing Sheets

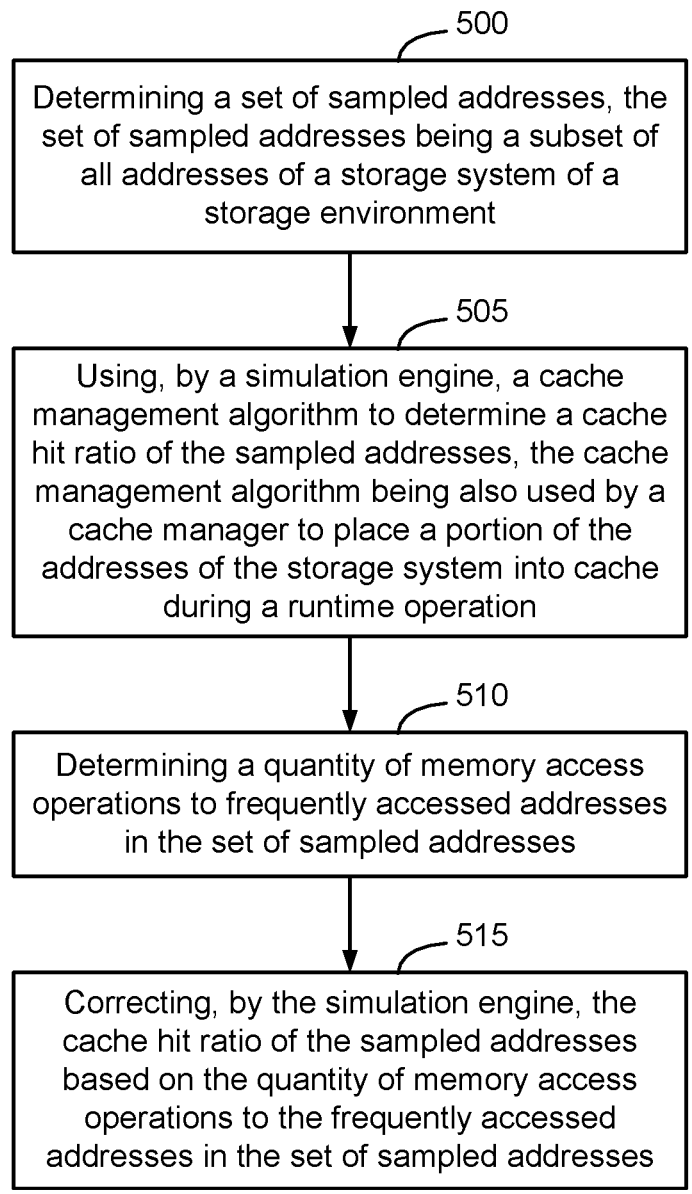

CACHE HIT RATIO SIMULATION USING A PARTIAL DATA SET

CROSS REFERENCE TO RELATED APPLICATIONS

This application is a divisional application of U.S. application Ser. No. 15/649,925, filed Jul. 14, 2017, entitled Cache Hit Ratio Simulation Using a Partial Data Set, now U.S. Pat. No. 10,713,164, the content of which is hereby incorporated herein by reference.

BACKGROUND

This disclosure relates to computing systems and related devices and methods, and, more particularly, to cache hit ratio simulation using a partial data set.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

All examples and features mentioned below can be combined in any technically possible way.

In one aspect, a non-transitory tangible computer readable storage medium is provided that has stored thereon a computer program for implementing a method of cache hit ratio simulation using a partial data set. The computer program includes a set of instructions which, when executed by a computer, cause the computer to perform a method including the step of determining a set of sampled addresses, the set of sampled addresses being a subset of all addresses of a storage system of a storage environment. The method further includes using, by a simulation engine, a cache management algorithm to determine a cache hit ratio of the sampled addresses, the cache management algorithm being also used by a cache manager to place a portion of the addresses of the storage system into cache during a runtime operation. The method further includes determining a quantity of memory access operations to frequently accessed addresses in the set of sampled addresses, and correcting, by the simulation engine, the cache hit ratio of the sampled addresses based on the quantity of memory access operations to the frequently accessed addresses in the set of sampled addresses.

In some embodiments, the step of correcting comprises subtracting the quantity of memory access operations to frequently accessed addresses in the set of sampled addresses from a number of cache hits and from a total number of memory access operations.

In certain embodiments, the step of correcting further comprises obtaining actual cache size and actual hit ratio information from the storage system, and wherein correcting comprises determining a ratio of cache hits attributable to the quantity of memory access operations to frequently accessed addresses in the set of sampled addresses.

In some embodiments, the step of correcting comprises calculating a ratio of hits going to very active tracks (R_VAct) across all workloads as R_VAct=actual hit ratio (Actual_H) minus predicted adjusted hit ratio (Predict_H) divided by (1−Actual_H).

In certain embodiments, the subset is between 0.1% and 2% of all addresses of the storage system.

In some embodiments, the cache management algorithm handles sequential memory access operations differently than access operations to non-sequential memory addresses.

In certain embodiments, the step of correcting comprises maintaining a sequential table containing sequential information for at least some of the sampled addresses.

In some embodiments, the step of correcting further comprises checking the sequential table, for each memory access operation, to determine if the memory access operation is a sequential memory access operation.

In certain embodiments, the step of correcting further comprises purging addresses from the sequential table after a timeout threshold.

In some embodiments, the method further includes the step of adjusting cache size allocations for the applications based on the corrected cache hit ratios from the simulation engine.

In certain embodiments, the method further includes the step of iterating the step of determining a set of sampled addresses every simulation iteration interval.

In some embodiments, the step of correcting further comprises obtaining actual cache size and actual hit ratio information of the storage system, and wherein correcting comprises determining a ratio of cache hits attributable to the quantity of memory access operations to frequently accessed addresses in the set of sampled addresses. In some embodiments, within the simulation iteration interval, the method further includes the step of periodically receiving updated actual cache size and actual hit ratio information of the storage system.

In certain embodiments, the step of periodically receiving updated actual cache size and actual hit ratio information of the storage system occurs multiple times within the simulation iteration interval to obtain snapshots of the simulation during the simulation iteration interval. In certain embodiments at least a subset of the snapshots are averaged over time.

In another aspect, a storage environment includes a cache, a storage system, and a cache manager. The cache manager uses a cache management algorithm to place a portion of the addresses of the storage system into cache during a runtime operation. The data storage system also includes a simulation engine which implements control logic, which when executed on a processor, causes the processor to implement a method of cache hit ratio simulation using a portion of the addresses of the storage system. The method includes the step of determining a set of sampled addresses, the set of sampled addresses being a subset of all addresses of a storage system of a storage environment. The method further includes using, by the simulation engine, the cache management algorithm to determine a cache hit ratio of the sampled addresses. The method further includes determining a quantity of memory access operations to frequently accessed addresses in the set of sampled addresses, and correcting, by the simulation engine, the cache hit ratio of the sampled addresses based on the quantity of memory access operations to the frequently accessed addresses in the set of sampled addresses.

In some embodiments, the method further includes the step of iterating the step of determining a set of sampled addresses every simulation iteration interval.

In certain embodiments, the step of correcting further comprises obtaining actual cache size and actual hit ratio information of the storage system, and wherein correcting comprises determining a ratio of cache hits attributable to the quantity of memory access operations to frequently accessed addresses in the set of sampled addresses. In certain embodiments, within the simulation iteration interval, the method further includes the step of periodically receiving updated actual cache size and actual hit ratio information of the storage system.

In certain embodiments, the step of periodically receiving updated actual cache size and actual hit ratio information of the storage system occurs multiple times within the simulation iteration interval to obtain snapshots of the simulation during the simulation iteration interval. In certain embodiments, the step of at least a subset of the snapshots are averaged over time.

In certain embodiments, the cache management algorithm handles sequential memory access operations differently than access operations to non-sequential memory addresses.

In certain embodiments, the step of correcting comprises maintaining a sequential table containing sequential information for at least some of the sampled addresses.

BRIEF DESCRIPTION OF THE DRAWINGS

FIG. 5 is a flow chart of a method of cache hit ratio simulation using a partial data set.

DETAILED DESCRIPTION

This disclosure is based, at least in part, on the realization that it would be advantageous to provide cache hit ratio simulation using a partial data set.

Figure 1:
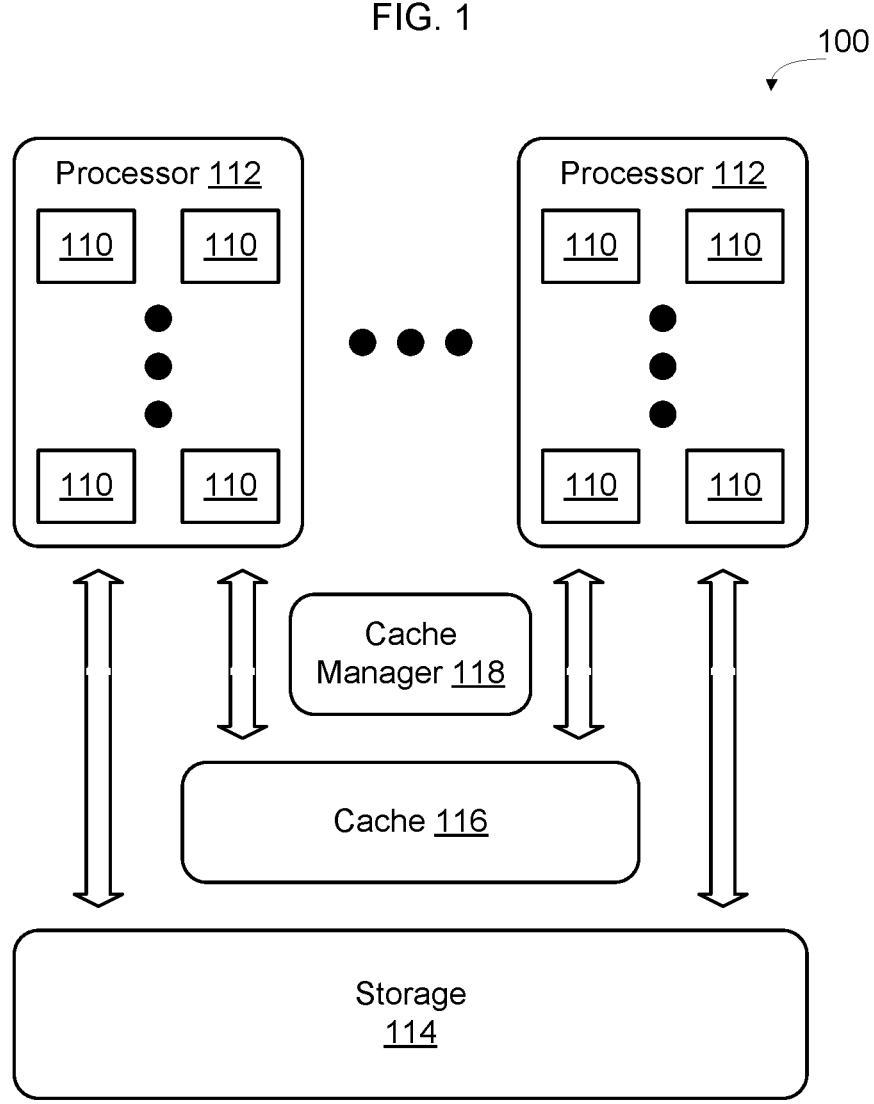
FIG. 1 is a functional block diagram of an example storage environment configured to provide a method of cache hit ratio simulation using a partial data set according to an embodiment.

FIG. 1 shows an example storage environment 100 in which one or more applications 110 are executing on one or more processors 112. Applications 110 access data stored in storage 114. A storage access operation will be referred to as an Input/Output (I/O) operation. Cache 116 is provided to accelerate processing of I/O operations. A cache manager 118 implements a cache management algorithm 122 (FIG. 3) to determine which data should be stored in storage 114 and which data should be stored in cache 116.

Components of storage environment 100 may be implemented in myriad ways. For example, in some implementations applications run on virtual machines abstracted from processors 112 by a hypervisor (not shown). In other implementations, applications may run on individual processors or may run on sets of processors.

Storage 114 and/or cache 116 may be directly connected to processors 112 or may be provided by a storage system connected to the other components of the storage environment 100 by a network (not shown). In other implementations, applications can run on processors 112 that are directly controlling the storage 114 and/or cache 116. The manner of providing cache hit ratio simulation using a partial data set described herein may be useful in connection with any storage environment 100 in which multiple applications 110 contend for access to a shared cache 116, regardless of the particular manner in which the storage environment 100 is physically/logically implemented.

Reading data from a cache 116 typically exhibits lower latency than reading data from storage 114. Even when storage 114 uses the same type of storage technology, e.g. both cache 116 and storage 114 are implemented using solid state Flash drives, the latency associated with reading data from cache 116 may be significantly lower than latency associated with reading the same data from storage 114, e.g. due to proximity of the cache to the processors 112. Since reducing data access latency tends to increase application 110 performance, one goal of the cache manager 118 is to attempt to place data into the cache 116 that is likely to be required by one or more of the applications 110. The term "cache hit" will be used herein to refer to an I/O operation that is able to read requested data from the cache 116. The term "cache miss" will be used herein to refer to an I/O operation that is not able to read requested data from the cache 116.

Figure 2:
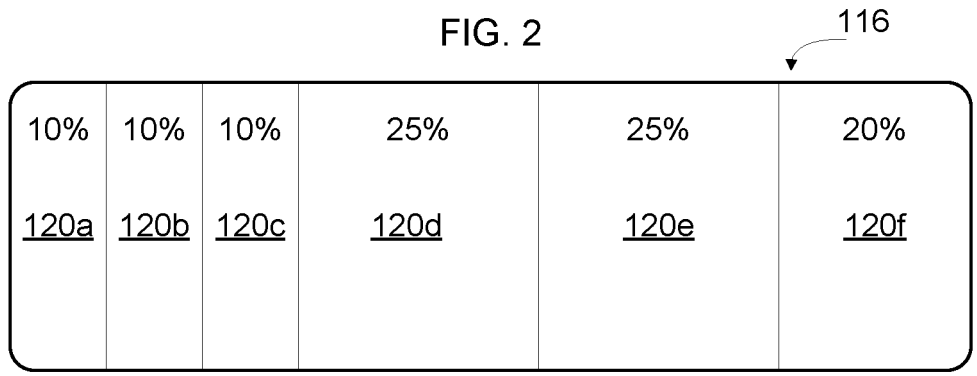
FIG. 2 is a functional block diagram of an example cache.

FIG. 2 shows partitioning of an example cache into cache allocations 120a-120f according to some implementations. As shown in FIG. 2, the cache 116 may be considered to be a shared resource, in which different amounts of cache are reserved to store data for each of the applications 110 of storage environment 100. In the example shown in FIG. 2, the cache has been allocated such that three allocations 120a, 120b, and 120c are each equal to 10% of the cache, two allocations 120d and 120e are each equal to 25% of the cache, and one allocation 120f is equal to 20% of the cache. The cache allocations may be allocated to particular individual applications 110 or may be allocated to sets of applications 110. Although FIG. 2 shows physical partitioning of the cache 116 for ease of explanation and ease of illustration, in actuality the cache manager 118 will simply allocate a particular amount of storage to each of the applications 110, rather than allocating particular ranges of memory addresses to particular applications 110. Likewise, although only six regions are shown in FIG. 2 for ease of explanation and ease of illustration, in an operational storage environment 100, there may be hundreds, thousands, or even hundreds of thousands of applications vying for space in the cache.

Figure 3:
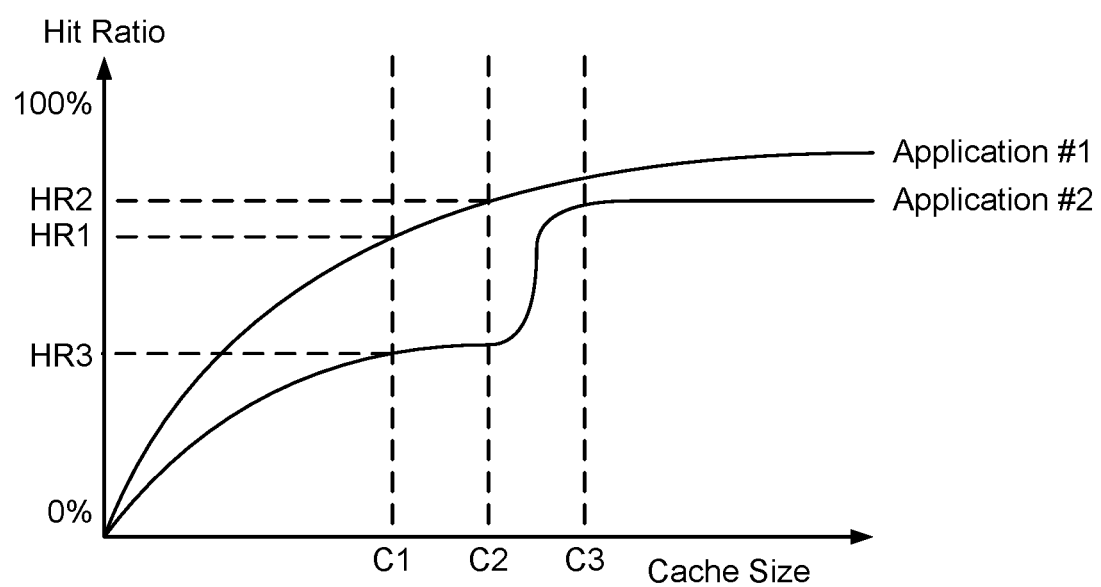
FIG. 3 is a graph showing example hit ratio variations of applications based on cache size.

FIG. 3 is a graph showing several ways in which the cache hit ratio may vary as the cache size is adjusted. In general, increasing the cache size will increase the hit ratio. As used herein, the term "cache hit ratio" is used to refer to the percentage of cache hits vs cache misses. A cache hit ratio of 100% occurs where every data read I/O operation is able to be served from the cache. A cache hit ratio of 0% occurs where no data read I/O operations are able to be served from the cache.

As shown in FIG. 3, there are some instances where increasing the cache size will significantly positively affect the cache hit ratio and there are other instances where increasing the cache size may not significantly positively affect the cache hit ratio for a particular application. For example, in the hypothetical graph shown in FIG. 3, increasing the cache size from C1 to C2 will moderately improve cache hit ratio for application 1, by increasing the cache hit ratio from HR1 to HR2. However, increasing the cache size from C1 to C2 will not significantly affect the cache hit ratio of application #2, since the cache hit ratio of application #2 is approximately the same at cache sizes C1 and C2. However, increasing the cache size to C3 will make a dramatic difference in the cache hit ratio for application #2, causing the cache hit ratio of application #2 to rise significantly from HR3 to approximately HR2.

To obtain optimal performance for the set of applications sharing the cache 116, it is thus desirable to intelligently partition the cache 116. One way to do this is to model cache performance assuming various cache sizes, to determine application performance (cache hit ratio per application) under varying cache allocation schemes. Using cache simulation it is possible to hypothetically vary the amount of cache allocated to the various applications 110 running in the storage environment 100, to determine how modification of the current cache allocations would affect the cache hit ratio performance of those applications. Based on the simulation results, the cache manager 118 can then make modifications to the cache allocations 120 to optimize performance for one or more of the applications 110.

Figure 4:
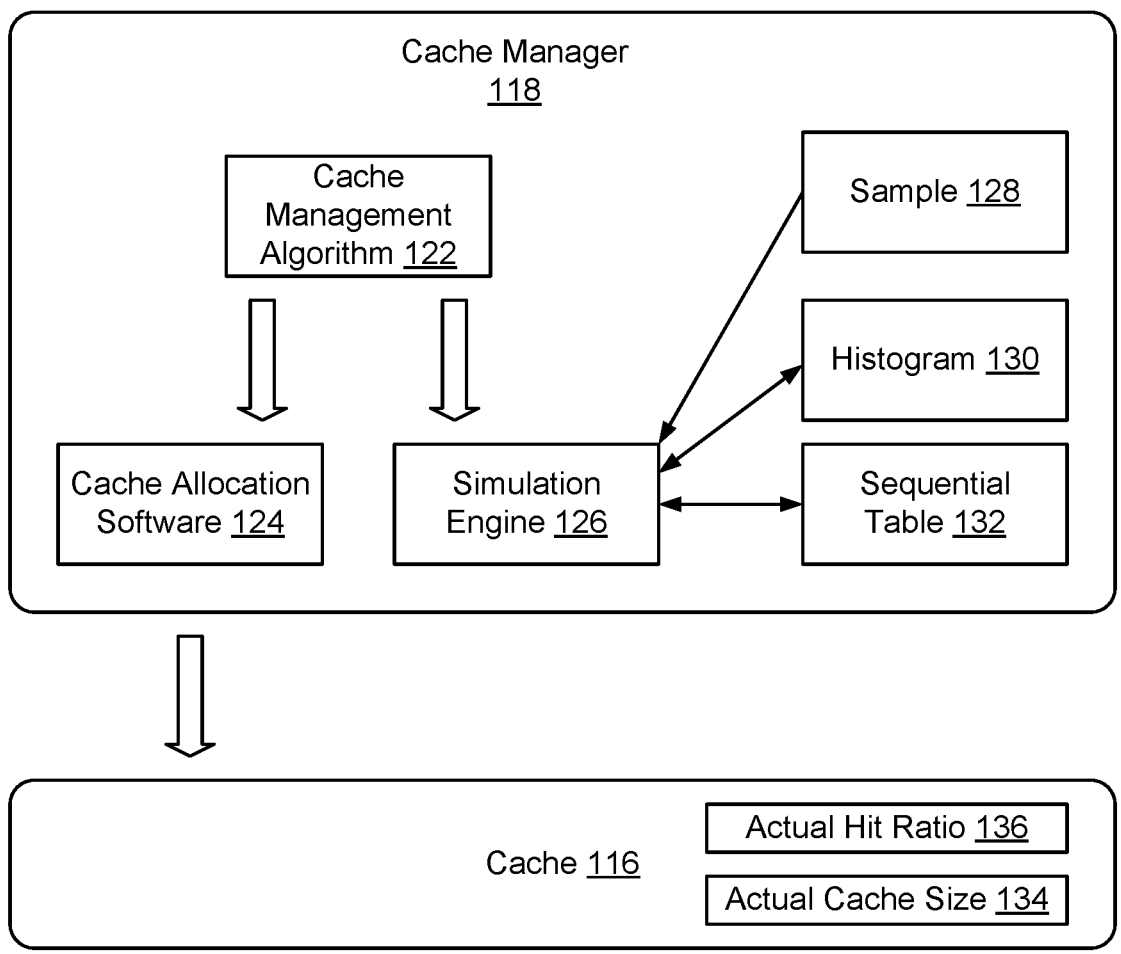
FIG. 4 is a functional block diagram of a cache manager configured to implement a method of cache hit ratio simulation using a partial data set according to an embodiment.

FIG. 4 is a functional block diagram of an example cache manager 118. As shown in FIG. 4, the cache manager 118 includes a cache management algorithm 122. The cache manager 118 uses the cache management algorithm 122 to determine which addresses from storage 114 should be stored in cache 116, to allow applications 110 to access data from both storage 114 and cache 116.

There are many cache management algorithms that have been developed, and the particular cache hit ratio simulation process described herein may work with any cache management algorithm.

According to an implementation, the same cache management algorithm 122 that is used by the cache manager 118 in connection with cache allocation software 124 to move data into and out of the cache 116 during runtime is also used by simulation engine 126 to perform cache simulation using a partial data set.

Although it would be possible to perform cache simulation using a full memory address set of all data stored in storage 114, by looking at all I/O operations and seeing how adjusting the cache sizes would have affected the hit rates, doing so would be processor and memory prohibitive. According to some implementations, the cache manager 118 or other cache modeling system obtains a sampling 128 of the addresses stored in storage 114 and uses the sampling 128 for cache simulation in a simulation engine 126.

As noted above, the simulation engine performs cache simulation using the same cache management algorithm 122 as the cache allocation software, but does so on a sampling of data 128 of data in storage 114, rather than on all data in storage 114. In some implementations the address sampling is between 0.1% and 2% of the addresses stored in storage 114. In some implementations the address sampling 128 is on the order of 1% of the addresses of storage 114.

Initially, a sample size is determined. Depending on the implementation the sample may be between 0.1% and 2%, although other sample size ranges may be selected. A larger sampling requires simulation engine 126 to store more information in memory, and is more processor intensive, but may be more accurate. In some simulations a sampling of less than around 0.1% of the addresses in storage 114 may produce inaccurate results, whereas it was found that a sample size on the order of 1% generally produced more reliable results. Numerous address selection processes may be used to obtain the address sampling 128.

In addition to sampling 129, a cache size to be simulated is selected. For example, if a 128 TB cache is to be simulated, and each page of memory has a size of 128K, the cache to be simulated has on the order of 1 billion cache slots. Because the simulation will simulate only 1% of the full address range, this means that the simulation will need to simulate only 10 Million pages. In the simulation, each page will require about 64 bytes of memory, which means that the simulation will require approximately 650 MB of memory to implement.

The simulation engine 126 uses the cache management algorithm 122 and assumed work flows from applications 110 and simulates how many I/Os for the applications would have been satisfied from the cache, given the assumed hypothetical selected cache size. Workflows can be based on actual workflow access operations from applications 110 or can be simulated workflows. The simulation itself can be based on transparent boundary conditions.

In some implementations, after each hit, it is necessary to calculate the location of the page in the least recently used order relative to other pages in the extent. To speed this up, the pages (or pointers to the pages) in each extent will reside in an ordered tree. If each extent has 1024 pages, then each update or search will require about 10 operations. 1024 pages will also provide good enough granularity and accuracy.

In some implementations, in addition to the simulation, a histogram is created. The size of the histogram is N: the number of pages in each extent. After each hit to track M, the simulation engine 126 uses the ordered tree to determine how many pages in the extent are older than track M. Let it be K. The simulation engine increments the entry for K in the histogram 130. This histogram 130 can be used to determine what the hit ratio would be if the cache was smaller than the cache size (C_size) by any amount.

Some cache management algorithms 122 treat sequential memory access operations differently than non-sequential memory access operations. An intelligent identification and treatment of sequential patterns can significantly improve the cache hit ratio by pre-fetching data to the cache 116 before the servers (applications 110) ask for it. Additionally, since data that was brought to cache 116 as part of a sequence is much less likely to be accessed again in the near future, it is possible to improve the overall cache efficiency by getting sequentially read data out of the cache 116 sooner than normal.

In implementations where the cache management algorithm 122 treats sequentially read data differently than non-sequentially read data, it is preferable for the simulation engine 126 likewise treat sequentially read data approximately the same way as the actual cache management algorithm 122. However, the simulation engine 126 is operating on a sampling of data, rather than the complete data set, which can complicate determining whether a data access operation is sequential or non-sequential.

According to some implementations, assume that there is a Boolean function In_Sample(LUN, Page #) that tells the simulation engine 126 whether a given track/page is in the sample 128. Also assume that the cache management algorithm 122 handles sequential I/Os as follows: (1) it pre-fetches track M to cache 116 if tracks M−1, M−2, . . . M−x are in the cache 116 and they were brought to the cache 116 within the last T seconds; and (2) it cuts the tail of a sequence after P tracks—only P tracks of a sequence are ever stored in the cache 116 at once.

A difficulty for simulation engine 126, is that the sampling 128, used by simulation engine 126, only includes some of the memory addresses of the cache 116. Hence, it is difficult to determine from the sampling 128 whether an address is part of a sequence. According to some implementations, the simulation engine 126 maintains a sequential table 132 to help keep track of whether a sampled address is part of a sequence. In some implementations, for every track Y being accessed by an I/O:

a. If track Y+1, Y+2, . . . Y+n is in the sampling 128 (If: In_Sample(Y+1) or In_Sample(Y+2) . . . or . . . In_Sample (Y+x)) then a record of this I/O operation is maintained in the sequential table 132 along with the time the I/O operation happened.

b. If track Y is in the sampling 128 (If: In_Sample(Y)), the simulation engine 126 will use the sequential table to determine whether this is a sequential I/O. Specifically, the simulation engine 126 will look backwards X tracks to verify they are in the sequential table and have a recent timestamp. This allows the simulation engine to determine whether address Y is part of a sequential read or a non-sequential read.

c. To ensure that only P tracks of a sequentially read sequence are kept in the cache 116, the simulation engine will look to determine if track Y−P is in the sample (If: In_Sample(Y−P)). If track Y−P is in the cache 116, the simulation engine will look to determine whether it was part of a sequential pattern. If both conditions are true, the simulation engine 126 will remove track Y−P from the cache 116.

To maintain the sequential table 132, the size of the table is on the order of the simulated cache size, times the number of backwards tracks (X=3 in the above example). In a simulation where the number of simulated address is on the order of 10 million, the sequential table 132 will have up to approximately 30 Million entries. In practice a small fraction of this will be enough because of the fact that older data is able to be removed from the sequential table.

The sequential table 132, in some implementations, is managed to remove old entries. Specifically, the fact that other data was read more than a few seconds previously is not relevant when looking to determine if data is part of a sequence. According to an implementation, each entry in the sequential table 132 has a time stamp. The full data structure that contains the sequential information can be scanned periodically, and any "old" entries may be removed. In this context, "old" is older than 2 seconds, although in other implementations different time based thresholds may be used. The sequential table 132 may be scanned periodically in its entirety, for example after 20% of the table entries have been added. Likewise, the sequential table 132 may be partially scanned more frequently. For example, a fraction of the sequential table 132 may be scanned whenever 1 million new entries have been added.

Partial filled cache pages are not problematic. Specifically, since the same cache allocation algorithm 122 is used by both the simulation engine 126 and the cache allocation software 124, the simulation engine 126 will handle partially filled cache pages the same way as cache allocation software 124 does. Hence, the fact that some of the pages are not filled does not affect the simulation in simulation engine 126.

Experiments show that the results of partial simulations by simulation engine 126 were very close to results of full simulations in approximately 70% of simulations. But, in about 30% of cases, the differences between partial and full simulation were found to be significant, making partial simulations without correction deemed to be unreliable.

Applicant determined that one of the reasons for this discrepancy was that, in some workloads, there are a relatively small number of tracks that are being accessed hundreds or thousands or even tens of thousands of times. The inclusion or exclusion of these tracks in the sample may make a huge difference in the result of the partial simulation. For example, suppose that there are 100 tracks (out of 1 Billion tracks) that are responsible for 20% of the activity in the system. If a sample is selected (1% of the tracks) then if exactly one of these high access tracks is included in the sample the simulation will be accurate. If none of the tracks is included in the sample the partial simulation will underestimate the hit ratio by about 20%. On the other hand, if 2 or more of the high access tracks are in the sample, the partial simulation will under estimate the miss ratio by 20% or more.

Thus, applicant found, in some data access operations there are situations where a relatively small number of tracks are being accessed thousands of times more frequently than other tracks. The result of the partial simulation generated by simulation engine 126 depends on how many of these tracks are included in the sample 128. Since this cannot be controlled, according to some implementations, the simulation engine 126 uses a corrective mechanism to allow the simulated cache hit ratio results to be adjusted based on the number of high access addresses included in the sample 128.

To correct this issue, according to some implementations, two extra numbers are obtained from the storage environment 100 that experienced the workload: (1) the actual cache size 134; and (2) the actual hit ratio 136 (Actual_H). These numbers are almost always available within a storage environment 100. No other changes to the actual storage system are needed.

To correct for the high access tracks, the simulation engine 126 first performs a simulation using the sample (partial data set) while counting how many I/Os went to very active tracks. The number of I/Os that went to very active tracks will be referred to as N_VAct (Number of Very Active).

Using N_VAct the simulation engine 126 adjusts the simulation results by subtracting N_VAct from the hit count and also from the total workload I/O count. The adjusted simulation results and the histogram 130 are then used to predict the hit ratio (Predict_H) for the I/O operations that are associated with all addresses other than the very active addresses for the actual cache size 134 of the system.

At this point the simulation engine has two numbers: Actual_H=the actual hit ratio 136 reported by the system; and Predict_H=the predicted hit ratio based on the adjusted simulation results. Since Predict_H is generated by the simulation engine 126 as the hit ratios excluding the very active tracks, the difference between Actual_H and Predict_H is due to the very active tracks.

To correct the simulation results, the simulation engine calculates the ratio of hits going to very active tracks (R_VAct) across all workloads as R_VAct=(Actual_H−Predict_H)/(1−Actual_H). This follows from Actual_H=(Predict_H+R_VAct)/(1+R_VAct). For example, when Predict_H=20% and Actual_H=30%, R_VAct=(0.3−0.2)/(1−0.3)=14%.

To estimate the hit ratio for a certain cache size C_Z, the adjusted simulation results and the histogram are used by the simulation engine 126 to determine a pre-estimate hit ratio for the selected cache size. The pre-estimate is the estimated hit ratio if there were no very active tracks. The correct estimation of hit ratio is then calculated by the simulation engine 126 as Actual_H(C_Z)=(P_Estimate+R_VAct)/(1+R_VAct).

Within the simulation period the actual cache size allocations and actual hit ratios from the storage system may vary. Accordingly, updated cache size allocations and actual hit ratios are periodically received from the storage system and used to obtain a snapshot of the current state of the storage system. In some implementations the snapshot interval may be on the order of 2 minutes. In other implementations different snapshot intervals may be used. The snapshot interval may be fixed or may be variable as a function of a simulation metric, such as the cache fall through time, cache simulation time, etc. The calculations of the final simulation results—the expected hit ratios—will take into account an average of the snapshots collected during the simulation period.

FIG. 5 is a flow chart of a method of cache hit ratio simulation using a partial data set. As shown in FIG. 5, in some embodiments a method of cache hit ratio simulation using a partial data set includes determining a set of sampled addresses, the set of sampled address being a subset of all addresses of a storage system of a storage environment (block 500). In some embodiments, the method includes using, by a simulation engine, a cache management algorithm to determine a cache hit ratio of the sampled addresses, the cache management algorithm being also used by a cache manager to place a portion of the addresses of the storage system into cache during a runtime operation (block 505). In some embodiments, the method includes determining a quantity of memory access operations to frequently accessed addresses in the set of sampled addresses (block 510). In some embodiments, the method includes correcting, by the simulation engine, the cache hit ratio of the sampled addresses based on the quantity of memory access operations to the frequently accessed addresses in the set of sampled addresses (block 515).

The following reference numbers are used in the drawings:
100 storage environment
110 application
112 processor
114 storage
116 cache
118 cache manager
120 cache allocation
122 cache management algorithm
124 cache allocation software
126 simulation engine
128 sampling
130 histogram
132 sequential table
134 actual cache size
136 actual hit ratio The methods described herein may be implemented as software configured to be executed in control logic such as contained in a CPU of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for implementing a method of cache hit ratio simulation using a partial data set, the computer program including a set of instructions which, when executed by a computer, cause the computer to perform a method comprising the steps of:

determining a set of sampled addresses, the set of sampled addresses being a subset of all addresses of a storage system of a storage environment, the set of sampled addresses being fewer than all addresses of the storage system and being taken across a full address range of the storage system;

monitoring read IO operations on the set of sampled addresses;

maintaining a sequential table containing sequential information for the sampled addresses to keep track of whether read IO operations on the sampled addresses are associated with sequential read IO operations;

implementing, by a simulation engine, a cache simulation using only the set of sampled addresses, the simulation engine using a cache management algorithm to determine a cache hit ratio of the set of sampled addresses, the cache management algorithm being also used by a cache manager to place a portion of the addresses of the storage system into cache during a runtime operation, the cache management algorithm being configured to pre-fetch addresses to the cache in connection with sequential memory access operations and being configured to not pre-fetch addresses to the cache in connection with memory access operations to non-sequential memory addresses;

using the sequential table, by the simulation engine, to determine when read IO operations on the set of sampled addresses are part of sequential read IO operations;

determining a quantity of memory access operations to frequently accessed addresses in the set of sampled addresses; and correcting, by the simulation engine, the cache hit ratio of the set of sampled addresses on the cache simulation based on the quantity of memory access operations to the frequently accessed addresses in the set of sampled addresses.

2. The non-transitory tangible computer readable storage medium of claim 1, wherein the step of using the sequential table, by the simulation engine, comprises checking the sequential table by the simulation engine, for each read IO operation, to determine if the read IO operation is a sequential read IO operation.

3. The non-transitory tangible computer readable storage medium of claim 1, wherein the step of maintaining the sequential table further comprises purging addresses from the sequential table after a timeout threshold.

4. The non-transitory tangible computer readable storage medium of claim 1, further comprising the step of adjusting cache size allocations based on a corrected cache hit ratio from the simulation engine.

5. The non-transitory tangible computer readable storage medium of claim 1, further comprising: periodically determining a new set of sampled addresses, and using the new set of sampled addresses for a simulation iteration interval.

6. The non-transitory tangible computer readable storage medium of claim 5, wherein, within the simulation iteration interval, the method further comprises the step of periodically receiving updated actual cache size and actual hit ratio information of the storage system.

7. The non-transitory tangible computer readable storage medium of claim 6:
wherein periodically receiving updated actual cache size and actual hit ratio information of the storage system occurs multiple times within the simulation iteration interval to obtain snapshots during the simulation iteration interval, and
wherein at least a subset of the snapshots are averaged over time.

8. The non-transitory tangible computer readable storage medium of claim 1, wherein the subset of all addresses is between 0.1% and 2% of all addresses of the storage system.

9. A storage environment, comprising:
a cache;
a storage system; and
a cache manager, the cache manager using a cache management algorithm to place a portion of the addresses of the storage system into cache during a runtime operation; and
a simulation engine, the simulation engine implementing control logic, which when executed on a processor, cause the processor to implement a method of cache simulation using a portion of the addresses of the storage system, the method including the steps of:
determining a set of sampled addresses, the set of sampled addresses being a subset of all addresses of the storage system, the set of sampled addresses being fewer than all addresses of the storage system and being taken across a full address range of the storage system;
monitoring read IO operations on the set of sampled addresses;
maintaining a sequential table containing sequential information for the sampled addresses to keep track of whether read IO operations on the sampled addresses are associated with sequential read IO operations;
implementing, by the simulation engine, a cache simulation using only the set of sampled addresses, the simulation engine using a cache management algorithm to determine a cache hit ratio of the set of sampled addresses, the cache management algorithm being also used by a cache manager to place a portion of the addresses of the storage system into cache during a runtime operation, the cache management algorithm being configured to pre-fetch addresses to the cache in connection with sequential memory access operations and being configured to not pre-fetch addresses to the cache in connection with memory access operations to non-sequential memory addresses;
using the sequential table, by the simulation engine, to determine when read IO operations on the set of sampled addresses are part of sequential read IO operations;
determining a quantity of memory access operations to frequently accessed addresses in the set of sampled addresses; and
correcting, by the simulation engine, the cache hit ratio of the set of sampled addresses on the cache simulation based on the quantity of memory access operations to the frequently accessed addresses in the set of sampled addresses.

10. The storage environment of claim 9, wherein the step of using the sequential table, by the simulation engine, comprises checking the sequential table by the simulation engine, for each read IO operation, to determine if the read IO operation is a sequential read IO operation.

11. The storage environment of claim 9, wherein the step of maintaining the sequential table further comprises purging addresses from the sequential table after a timeout threshold.

12. The storage environment of claim 9, further comprising the step of adjusting cache size allocations based on a corrected cache hit ratio from the simulation engine.

13. The storage environment of claim 9, further comprising: periodically determining a new set of sampled addresses, and using the new set of sampled addresses for a simulation iteration interval.

14. The storage environment of claim 13, wherein, within the simulation iteration interval, the method further comprises the step of periodically receiving updated actual cache size and actual hit ratio information of the storage system.

15. The storage environment of claim 14:
wherein periodically receiving updated actual cache size and actual hit ratio information of the storage system occurs multiple times within the simulation iteration interval to obtain snapshots during the simulation iteration interval, and
wherein at least a subset of the snapshots are averaged over time.

16. The storage environment of claim 9, wherein the subset of all addresses is between 0.1% and 2% of all addresses of the storage system.

* * * * *